United States Patent

[11] 3,609,514

[72] Inventors Robert J. Nowakowski
 Indianapolis;
 Robert W. Campbell, Anderson; Ronald A. Martin, Anderson, all of Ind.
[21] Appl. No. 58,363
[22] Filed July 27, 1970
[45] Patented Sept. 28, 1971
[73] Assignee General Motors Corporation
 Detroit, Mich.

[54] GENERATOR VOLTAGE REGULATOR
 4 Claims, 1 Drawing Fig.
[52] U.S. Cl. .................................................. 322/28,
 322/64, 322/73
[51] Int. Cl. ............................................ H02p 9/30
[50] Field of Search........................................... 322/28, 59,
 63, 64, 73; 320/65, 66

[56] References Cited
 UNITED STATES PATENTS
 3,353,088  11/1967  Roche ......................... 322/63 X
 3,510,752  5/1970   Raver et al. .................... 322/28
 3,521,148  7/1970   Kirk et al. ...................... 322/28

Primary Examiner—Benjamin Dobeck
Assistant Examiner—H. Huberfeld
Attorneys—E. W. Christen and C. R. Meland ABSTRACT: A voltage regulating system which is capable of controlling the output voltage of an alternating current generator which has a permanent magnet field, a main field winding and a reverse field winding. The voltage regulator utilizes thyristors or controlled rectifiers connected in a full-wave circuit with a plurality of diodes. The main field of the generator is connected across the direct current output terminals of the bridge circuit and its energization is controlled in accordance with the conduction of the controlled rectifiers. The reverse field winding of the generator is connected in series with another controlled rectifier having its gate-cathode circuit connected across the anode-cathode circuit of one of the controlled rectifiers of the bridge circuit. With this arrangement the controlled rectifier connected with the reverse field winding is biased conductive when the bridge controlled rectifiers are biased nonconductive and this controlled rectifier is biased nonconductive when the bridge controlled rectifiers are biased conductive. The conduction of the bridge controlled rectifiers is controlled by a circuit which senses the output voltage of the generator.

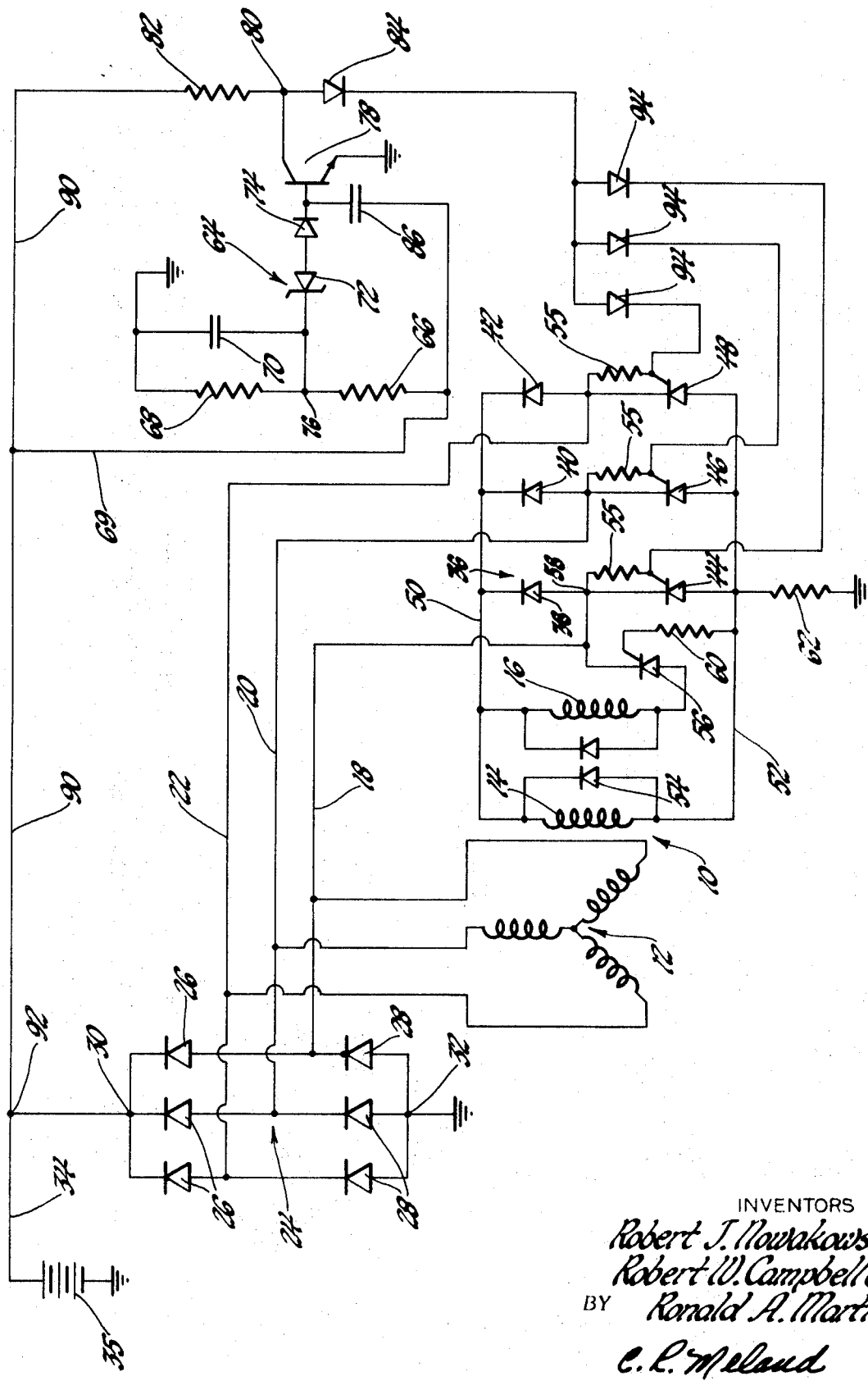

GENERATOR VOLTAGE REGULATOR

This invention relates to a voltage regulating system which is capable of controlling the energization of main and reverse field windings of an alternating current generator.

It is known in the art of alternating current generators to provide a generator which has a field produced by one or more permanent magnets and main and reverse field windings. Such a generator is shown in the U.S. Pat. No. 3,392,294, to Campbell, granted on July 9, 1968. Voltage regulating systems for this type generator are also known. One example of a transistor regulating system for the type of generator described is the system disclosed in the patent to Raver et al. 3,512,075, granted on May 12, 1970. Voltage regulating system utilizing controlled rectifiers to energize main and reverse field windings of a generator are also known and one system of this type is disclosed in the patent to Kirk et al., 3,363,416, granted on Jan. 16, 1968.

The present invention is concerned with controlled rectifier or thyristor field current control for main and reverse field windings of a generator and in contrast to the system shown in the patent to Kirk et al. mentioned above it is an object of this invention to provide a regulating system that is relatively simple and does not require an oscillator for its operation. In carrying this object forward the voltage regulating system of this invention utilizes a voltage sensing and gate firing circuit which senses the output voltage of the generator and which controls the application of gate signals to a plurality of controlled rectifiers which, together with a plurality of diodes, form a bridge circuit for energizing the main field of the generator. The reverse field of the generator is controlled by another controlled rectifier coupled to one of the bridge controlled rectifiers and controls the energization of the reverse field winding as an inverse function of the energization of the main field winding.

It accordingly is another object of this invention to provide a regulating system for a generator having main and reverse field windings where the main field winding has its energization controlled by a full-wave bridge comprised in part of controlled rectifiers and where the energization of the reverse field winding is accomplished in a simple manner by another controlled rectifier coupled to one of the main bridge controlled rectifiers.

Another object of this invention is to provide a battery charging system for a motor vehicle where a diode-rectified alternating current generator is utilized to supply the electrical loads on the motor vehicle and to charge the battery and wherein the generator has main and reverse fields controlled by a voltage regulator that includes a bridge circuit comprised of a plurality of controlled rectifiers connected with the main field and further to a system wherein the reverse field is controlled by another controlled rectifier coupled to at least one of the bridge circuit controlled rectifiers.

IN THE DRAWINGS

The single Figure drawing is a schematic circuit diagram of a voltage regulating system made in accordance with this invention.

Referring now to the drawing, a motor vehicle electrical system is shown wherein the reference numeral 10 generally designates an alternating current generator having a three-phase Y-connected output winding 12 and main and reverse field windings designated respectively by reference numerals 14 and 16. The generator has a rotor (not illustrated) which is driven by an engine on a motor vehicle. The generator is preferably of a type which also has a permanent magnet field. The permanent magnets have not been illustrated and the generator can be of the type disclosed in the United States patents to Campbell and Raver et al. mentioned above. The three-phase output winding 12 of the generator is connected respectively with conductors 18, 20 and 22. It is seen that these conductors are connected with the AC input terminals of a three-phase full-wave bridge rectifier designated by reference numeral 24. This bridge rectifier is comprised of three positive silicon diodes 26 and three negative silicon diodes 28 and has direct current output terminals 30 and 32. The direct current output terminal 39 is connected with a power supply conductor 34 while the negative output terminal 32 is grounded. A storage battery 35 is connected between conductor 34 and ground and is therefore charged by the output of power bridge rectifier 24.

The conductors 18, 20 and 22 are connected with the AC input terminals of a field current supply bridge generally designated by reference numeral 36. This bridge current is comprised of three diodes 38, 40 and 42 and three controlled rectifiers 44, 46 and 48. The cathodes of the diodes are connected to a conductor 50 whereas the anodes of the controlled rectifiers are connected with a conductor 52. It is seen that the main field winding 14 of the generator 10 is connected directly across the conductors 50 and 52 and therefore will be supplied with direct current from the bridge circuit in a manner to be more fully described hereinafter. The field winding 14 is shunted by a conventional filed discharge diode 54. A resistor 55 is connected across each gate and cathode of controlled rectifiers 44, 46 and 48. This resistor may be built into a controlled rectifier or connected externally.

The reverse field winding 16 is connected in series with another controlled rectifier designated by reference numeral 56. The anode of controlled rectifier 56 is connected to one side of the field winding 16 while its cathode is connected to one of the AC input terminals 58 of the bridge 36. The gate of the controlled rectifier 56 is connected with conductor 52 through a resistor 60. It will be appreciated that the gate-cathode circuit of controlled rectifier 56 is connected across the anode-cathode circuit of controlled rectifier 44.

The conductor 52 is connected to ground through a resistor 62. The resistor 62, as will be more fully described hereinafter, provides a path for gate current for the controlled rectifiers 44, 46 and 48 during start up conditions of the system and may not be required where the generator has a permanent magnet field.

The conduction of controlled rectifiers 44, 46 and 48 is controlled by a voltage sensing and gate firing control circuit generally designated by reference numeral 64. This circuit 64 includes a voltage divider comprises of resistors 66 and 68 connected between an output voltage sensing conductor 69 and ground. A filter capacitor 70 is connected in parallel with the resistor 68. The voltage sensing and control circuit further includes a Zener diode 72 and a silicon diode 74. These two diodes are connected in series between a junction 76 on the voltage divider and the base of an NPN transistor 78. The emitter of transistor 78 is grounded and its collector is connected to a junction 80 located between resistor 82 and a silicon diode 84. A filter capacitor 86 is connected between conductor 69 and the base of transistor 78.

One side of resistor 82 is connected with a conductor 90 which in turn is connected to a junction 92. The voltage sensing conductor 69 is also connected to conductor 90 and therefore to junction 92. It therefore Therefore is seen that the voltage applied to voltage divider 66–68 is substantially the voltage applied to batter 35 and will be battery voltage when the system is shutdown. When the generator charges the battery a regulated voltage higher than battery voltage appears between junction 92 and ground.

The diode 84 is connected in series with resistor 82 and in series with three diodes 94 connected respectively with the gates of the controlled rectifiers 44, 46 and 48. The diodes 94 to provide isolation to prevent feedback from the gates of the controlled rectifiers during operation of the system.

The operation of the voltage regulator will now be described it being understood that the generator has a permanent magnet field of the type described in the above mentioned patents.

When the rotor of the generator, which is not illustrated is driven by an internal combustion engine on a motor vehicle the generator output voltage will build up. The regulating system will maintain a substantially constant charging voltage for the batter 35. It should be pointed out that the voltage divider comprised of resistors 66 and 68 senses the output voltage of bridge rectifier 24 and therefore the voltage applied to battery 35. As long as this voltage is below a desired regulated value the circuit, including Zener diode 72, diode 74 and the base-emitter circuit of transistor 78 will not break down so that transistor 78 will be biased nonconductive in its collector-emitter circuit. With this condition of operation the potential of junction 80 is of a sufficient value to bias the gates of controlled rectifiers 44, 46 and 48 positive with respect to their cathodes with the result that these controlled rectifiers are biased conductive. This means that field current will be supplied to the main field winding 14 with the result that the output voltage of the generator is increased.

When the output voltage between junction 92 and ground reaches a desired regulated value the Zener diode 72 will break down placing a forward bias on the base-emitter circuit of transistor 78 with the result that this transistor now becomes fully conductive in its collector-emitter circuit. When transistor 78 is biased conductive the junction 80 is connected substantially to ground with the result that the gate signals are substantially removed from the controlled rectifiers 44, 46 and 48 with the further result that these controlled rectifiers are biased nonconductive and current flow to the main field winding 14 is substantially interrupted. The controlled rectifiers are commutated off by the AC output of winding 12. The output voltage of the generator will now decrease to the point where transistor 78 no longer conducts whereupon gate signals are again supplied to controlled rectifiers 44, 46 and 48. It therefore will be appreciated that the system continuously switches the controlled rectifiers 44, 46 and 48 on and off to energize and deenergizes the field winding 14 to maintain the desired regulated voltage.

During the time that the controlled rectifiers 44, 46 and 48 are switching the main field winding 14 the controlled rectifier 56 is switching the reverse field winding 16 in an inverse relationship. Thus, when controlled rectifier 44 is biased conductive the voltage at conductor 53 is at a low value which is not sufficient to gate the controlled rectifier field and therefore when controlled rectifiers 44, 46 and 48 are biased on controlled rectifier 56 is biased nonconductive and the reverse field 16 is substantially deenergized.

When controlled rectifier 44 is biased nonconductive the potential of the gate of controlled rectifier 56 increases to a point where controlled rectifier 56 is gated conductive in its anode-cathode circuit. The reverse field winding 16 will now be energized from a circuit which, for example, can be traced from conductor 20, through diode 40, through conductor 50, through reverse field winding 16, through the anode-cathode circuit of controlled rectifier 56 and then to conductor 18 and a phase winding of output winding 12. The gate-cathode circuit for controlled rectifier 56 is, for example, from a phase winding of the generator 10 to conductor 20, through diode 40, through conductor 50, through main field 14, through resistor 60, through the gate-cathode circuit of controlled rectifier 56 and then through conductor 18 to another phase winding of the generator. Some of the gate current for controlled rectifier 56 flows through the main field winding 14 when it is gated conductive but this current is so insignificant that the field winding 14 can be considered to be substantially deenergized when reverse field winding 16 is energized.

The reverse field winding 16 is energized to counteract the field developed by the permanent magnet field at high speed operation of the generator. The resistor 62 is not required if the permanent magnet field of the generator is sufficient to cause the voltage of generator 10 to build from a startup condition. The resistor 62 does provide a conductive path for forward biasing the controlled rectifiers 44, 46 and 48 from the battery when the system is first started up. This circuit can be traced from the positive side of battery 35 through conductors 34 and 90, through resistor 82, through diodes 84 and 94, through the parallel circuits of resistors 55 and the gate-cathode circuits of controlled rectifiers 44, 46 and 48, through diodes 38–42, through main field 14 to conductor 52 and then through resistor 62 to ground.

Although the transistor 78 has been illustrated as a single transistor a pair of NPN transistors connected in a Darlington configuration could be utilized in place of the transistor 78.

The silicon diode 74 is utilized in the system to compensate for the changes in break down voltage of the Zener diode 72 with changes in temperature.

The purpose of silicon diode 84 is to provide a forward voltage drop that cancels out the voltage drop across the collector-emitter circuit of transistor 78 when it is biased to its conductive condition since when a transistor is biased fully conductive it still has a small voltage drop in its saturated condition. If the diode 84 were not provided the saturation voltage of transistor 78 might be sufficient to gate controlled rectifiers 44, 46 and 48 conductive when they should be nonconductive. If more voltage drop is required than can be provided by one diode a string of diodes, for example three diodes, can be substituted for the single diode 84 to provide a voltage drop in a forward direction equal to the number of diodes used,

What is claimed is:

1. An electrical system comprising, an alternating current generator having first and second field windings and a polyphase output winding, a field energizing bridge comprised of a plurality of controlled rectifiers and a plurality of diodes, said bridge having AC input terminals connected between a respective diode and controlled rectifier and with said output winding of said generator, means connecting said first field winding of said generator, means connecting said first field winding across the direct current output terminals of said field energizing bridge, voltage sensing means connected with said generator output winding for sensing the output voltage of said generator, means coupled to said voltage sensing means and to the gate electrodes of said controlled rectifiers for applying gating signals to said gate electrodes as a function of the output voltage of said generator, a controlled rectifier for controlling the application of current to said second field winding having its gate and cathode connected across the anode and cathode of one of said bridge controlled rectifiers, said controlled rectifier being gated conductive when said bridge controlled rectifiers are nonconductive and biased nonconductive when said bridge controlled rectifiers are conductive, and means connecting said second field winding in series with the anode-cathode circuit of said controlled rectifier in a circuit connected between one direct current output terminal of said field energizing bridge and one AC input terminal of said field energizing bridge whereby said first and second field windings of said generator are alternatively energized as a function of the output voltage of said generator and operate to maintain a substantially constant output voltage from said generator.

2. An electrical system comprising, an alternating current generator having an output winding, a main field winding, and a reverse field winding, a power bridge rectifier circuit having AC input terminals connected with said output winding and direct current output terminals connected with an electrical load, a field energizing bridge circuit comprised of a plurality of controlled rectifiers and a plurality of diodes, said field energizing bridge circuit having AC input terminals connected between a respective diode and controlled rectifier and with said output winding of each generator, means connecting said main field winding across the direct current output terminals of said field energizing bridge, a voltage divider connected across said power bridge rectifier to sense the output voltage of said power bridge rectifier, transistor means having a collector and an emitter, means coupling the base of said transistor means with said voltage, divider whereby the conduction of said transistor means is controlled as a function of the output voltage of said power bridge rectifier, a circuit connected between the gates of said controlled rectifiers of said field energizing bridge and one direct current output terminal of said bridge rectifier having a junction, means connecting the collector and emitter of said transistor means between said junction and the other side of said power bridge rectifier whereby gating signals are applied to the gates of said bridge circuit controlled rectifiers when said transistor means is biased nonconductive and signals are bypassed from the gate electrodes of said controlled, rectifiers when said transistor means is biased conductive, a controlled rectifier for controlling circuit connected in series with said reverse field winding and across one direct current output terminal and one AC input terminal of said field energizing bridge, and means connecting the gate and cathode of said controlled rectifier across the anode and cathode of one controlled rectifier of said field energizing bridge whereby said main and reverse field windings are alternately energized to maintain a substantially constant output voltage from said generator.

3. The electrical system according to claim 2 where at least one diode is connected in series between said junction and the gates of said bridge controlled rectifiers to develop a voltage which is operative to prevent the gating of said bridge controlled rectifiers by the voltage across said transistor means when said transistor means is biased fully conductive.

4. The electrical system according to claim 2 where the generator has said main and reverse field windings and permanent magnet field.

PO-1050
(5/69)

UNITED STATES PATENT OFFICE
CERTIFICATE OF CORRECTION

Patent No. 3,609,514                     Dated September 28, 1971

Inventor(s) Robert J. Nowakowski et al.

It is certified that error appears in the above-identified patent and that said Letters Patent are hereby corrected as shown below:

```
Column 1, line 10, after "type" insert -- of --.
Column 2, line  3, delete "39" and insert -- 30 --;
          line 10, delete "current" and insert -- circuit --;
          line 19, delete "filed" and insert -- field --;
          line 41, delete "comprises" and insert --
                   comprised --;
          line 55, delete "Therefore".
          line 57, delete "batter" and insert -- battery --;
          line 64, delete "to" (first occurrence).
Column 3, line  1, delete "batter" and insert -- battery --;
          line 29, delete "supplied" and insert -- applied --;
          line 32, delete "deenergizes" and insert --
                          deenergize --;
          line 38, delete "53" and insert -- 52 --;
          line 39, after "rectifier" insert -- 56 --;
          line 39, delete "field".
Column 4, line 20, delete the comma and insert a period.
          lines 28 and 29, delete "means connecting said first
                   field winding of said generator, --.
          line 48, delete "alternatively" and insert --
                   alternately --;
          line 60, delete "each" and insert -- said --;
          line 66, delete the comma.
Column 5, line  4, delete the comma.
          line  6, after "trolling" insert -- current in said
                   reverse field having its anode-cathode --.
Column 6, line  9, after "and" (second occurrence) insert
                   -- a --.
```

Signed and sealed this 4th day of July 1972.

(SEAL)
Attest:

EDWARD M.FLETCHER,JR.                ROBERT GOTTSCHALK
Attesting Officer                    Commissioner of Patents